United States Patent
Guerra et al.

(10) Patent No.: US 11,192,721 B2
(45) Date of Patent: Dec. 7, 2021

(54) SKATE WHEEL CONVEYOR WITH QUICK ASSEMBLE FEATURE

(71) Applicant: Lewco, Inc., Sandusky, OH (US)

(72) Inventors: Gerald T. Guerra, Sandusky, OH (US); Albert E. Sparling, Sandusky, OH (US); Mark Bosley, Johns Island, SC (US); Justin Zimmerman, Sandusky, OH (US)

(73) Assignee: LEWCO, INC., Sandusky, OH (US)

( * ) Notice: Subject to any disclaimer, the term of this patent is extended or adjusted under 35 U.S.C. 154(b) by 0 days.

(21) Appl. No.: 17/004,643

(22) Filed: Aug. 27, 2020

(65) Prior Publication Data

US 2020/0391948 A1 Dec. 17, 2020

Related U.S. Application Data

(63) Continuation of application No. 16/528,996, filed on Aug. 1, 2019, now Pat. No. 10,793,360.

(60) Provisional application No. 62/713,092, filed on Aug. 1, 2018, provisional application No. 62/798,063, filed on Jan. 29, 2019.

(51) Int. Cl.
*B65G 13/02* (2006.01)
*B65G 39/10* (2006.01)
*B65G 39/12* (2006.01)
*B65G 13/11* (2006.01)

(52) U.S. Cl.
CPC ............. *B65G 13/02* (2013.01); *B65G 39/10* (2013.01); *B65G 39/12* (2013.01); *B65G 13/11* (2013.01)

(58) Field of Classification Search
CPC ........ B65G 13/02; B65G 39/10; B65G 39/12; B65G 13/11; B65G 13/12
USPC ....................................................... 193/35 R
See application file for complete search history.

(56) References Cited

U.S. PATENT DOCUMENTS

| | | | |
|---|---|---|---|
| 3,126,090 A | 3/1964 | Bitzer | |
| 4,053,039 A * | 10/1977 | Shuttleworth | B65G 39/12 |
| | | | 193/35 R |
| 4,681,203 A | 7/1987 | Kornylak | |
| 4,720,007 A | 1/1988 | Milek | |
| 5,372,247 A | 12/1994 | Nishikawa | |
| 5,645,155 A * | 7/1997 | Houghton | B65G 39/12 |
| | | | 193/35 R |
| 5,875,878 A * | 3/1999 | Pierson | B65G 39/12 |
| | | | 193/37 |
| 6,073,743 A * | 6/2000 | Mefford | B65G 1/023 |
| | | | 193/35 R |
| 6,702,091 B2 | 3/2004 | Nimmo et al. | |
| 7,028,825 B2 | 4/2006 | Scott | |
| 8,206,277 B2 * | 6/2012 | Sutton | B65H 27/00 |
| | | | 492/7 |
| 8,720,662 B2 * | 5/2014 | Arsenenau | B65G 39/09 |
| | | | 193/37 |
| 10,793,360 B2 * | 10/2020 | Guerra | B65G 39/10 |

(Continued)

*Primary Examiner* — James R Bidwell
(74) *Attorney, Agent, or Firm* — Shumaker, Loop & Kendrick, LLP; James D. Miller

(57) ABSTRACT

A skate wheel conveyor system includes a pair of frame sides of a frame assembly. A plurality of preassembled rollers is received between the pair of frame members. Each of the rollers includes a plurality of wheels interposed between a plurality of spacers and a shaft receiving the plurality of wheels and the plurality of spacers. A quick assembly system retains the rollers between the pair of frame members and minimizing deflections of the preassembled rollers.

19 Claims, 8 Drawing Sheets

(56) References Cited

U.S. PATENT DOCUMENTS

| | | | |
|---|---|---|---|
| 2003/0047414 A1* | 3/2003 | Henson | B65G 39/09 193/35 R |
| 2006/0037833 A1* | 2/2006 | Lawless | B65G 13/11 193/35 R |
| 2010/0252393 A1 | 10/2010 | Chen | |

* cited by examiner

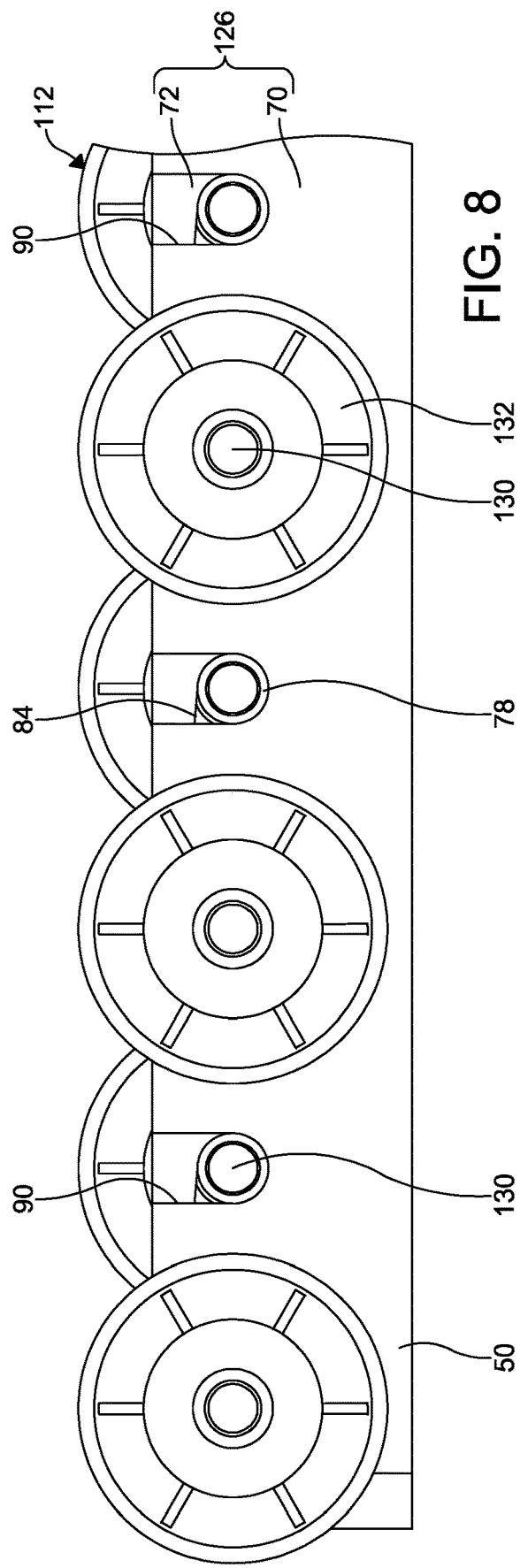

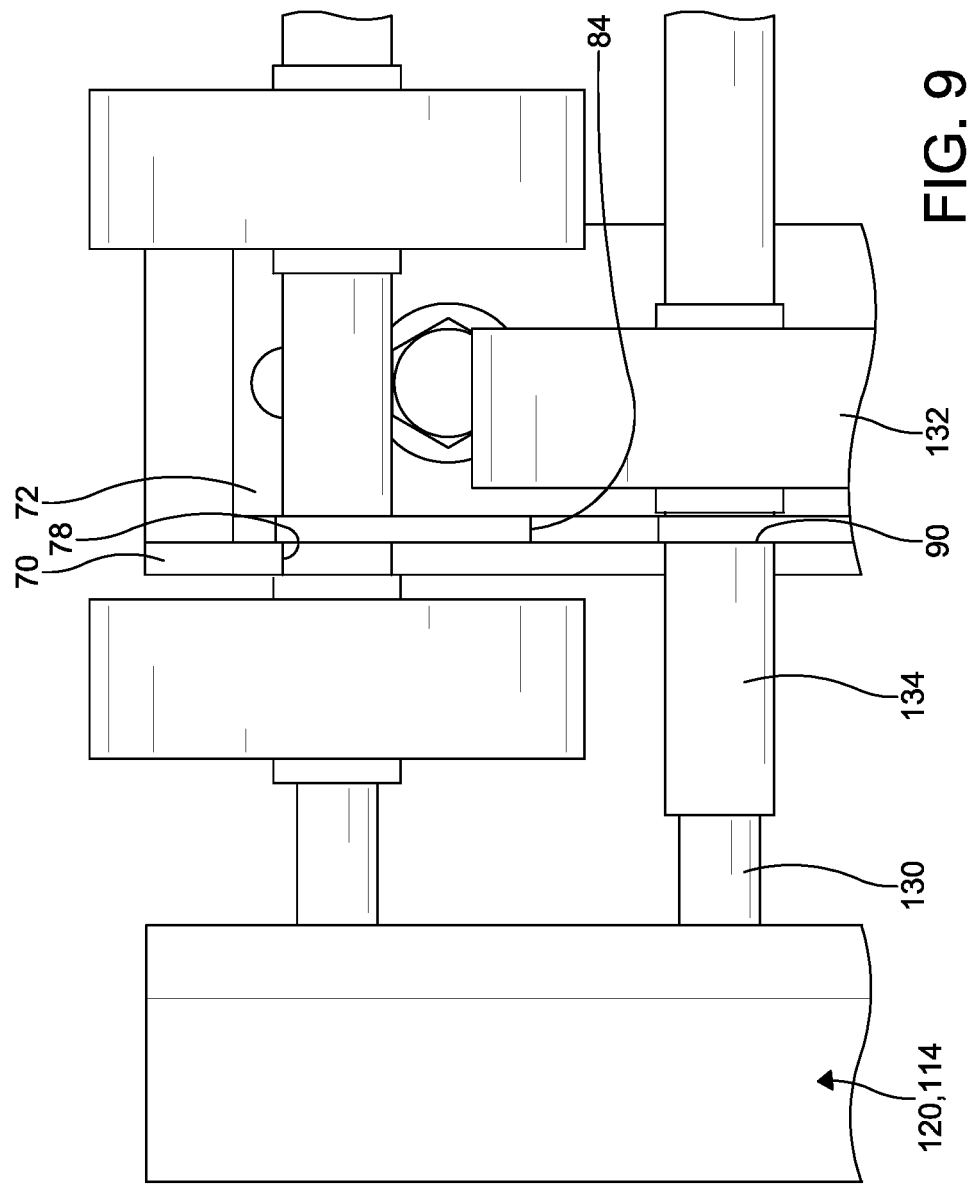

SKATE WHEEL CONVEYOR WITH QUICK ASSEMBLE FEATURE

CROSS-REFERENCE TO RELATED APPLICATIONS

This patent application is a continuation patent application of U.S. patent application Ser. No. 16/528,996 filed on Aug. 1, 2019, which claims the benefit of the benefit of U.S. Provisional Patent Application Ser. No. 62/798,063 filed on Jan. 29, 2019 and U.S. Provisional Patent Application Ser. No. 62/713,092 filed on Aug. 1, 2018. The entire disclosures of the above patent applications are hereby incorporated herein by reference.

FIELD OF INVENTION

The invention relates to conveyor systems and more particularly to assemblies of skate wheel conveyor system.

BACKGROUND

Skate wheel conveyors have been around for many years and are commonly employed for material handling to transport products or equipment from one location to another location. Skate wheel conveyors are typically an economical option for conveying the products. As known, a skate wheel conveyor uses a plurality of spaced apart skate wheel rollers. Each of the rollers includes a series of skate wheels mounted on a common shaft or axle with spacers or tubes interposed between each of the wheel on the shaft. Depending on the product size to be conveyed, the skate wheel conveyor assembly can be relatively simple with minimal parts to assemble. However, if the product to be conveyed is heavy or large, a heavy wheel concentration per skate wheel conveyor system is required to properly to handle the load.

To assemble the skate wheel conveyors systems, the wheels, spacers, and axles are typically individually shipped and must be manually assembled to form each roller of the skate wheel conveyor system. The wheels and spacers must be assembled in a progressive pattern onto the axles. The rollers are positioned within a frame assembly of the skate wheel conveyor system. In particular, the rollers must be positioned through multiple support bars and outside frame members. Assembly can be undesirably time consuming. In addition, it is very difficult and time consuming to disassemble the conveyor in order to repair parts such as a broken wheel.

Therefore, it would be desirable to provide preassembled skate wheel conveyor rollers and a skate wheel conveyor system that facilitates ease of assembly and minimizes manufacturing costs and complexity of the skate wheel conveyor systems.

BACKGROUND

In accordance and attuned with the instant disclosure, preassembled skate wheel conveyor rollers and a skate wheel conveyor system that facilitates ease of assembly and minimizes manufacturing costs and complexity of the skate wheel conveyor systems, has surprisingly been discovered.

According to an embodiment of the disclosure, a skate wheel conveyor system includes a pair of frame sides of a frame assembly. A plurality of preassembled rollers is received between the pair of frame members. Each of the rollers includes a plurality of wheels interposed between a plurality of spacers and a shaft receiving the plurality of wheels and the plurality of spacers. A quick assembly system retains the rollers between the pair of frame members and minimizing deflections of the preassembled rollers.

According to another embodiment of the disclosure, a skate wheel conveyor system includes a pair of frame sides of a frame assembly. The pair of frame sides each including an aperture formed therein. The plurality of rollers received between the pair of frame sides. Each of the plurality of rollers including a plurality of wheels interposed between a plurality of spacers and a shaft receiving the plurality of wheels and the plurality of spacers. The first compression end cap coupled to a first end of the plurality of rollers, a portion of the first compression end cap received in the aperture of a first one of the pair of frame sides.

According to yet another embodiment of the disclosure, a skate wheel conveyor system is disclosed. The system includes a pair of frame sides of a frame assembly, the pair of frame sides each including an aperture formed therein. A plurality of rollers are received between the pair of frame sides. Each of the plurality of rollers including a plurality of wheels interposed between a plurality of spacers and a shaft receiving the plurality of wheels and the plurality of spacers A retaining support extending along a length of the frame assembly. The retaining support including an angled member including a plurality of slots for receiving the plurality of rollers therein. The angled member sliding from a first position to clamp the plurality of rollers to the frame assembly and a second position to unclamp the plurality of rollers from the frame assembly.

BRIEF DESCRIPTION OF THE DRAWINGS

The above, as well as other advantages of the present invention, will become readily apparent to those skilled in the art from the following detailed description of preferred embodiments when considered in light of the accompanying drawings which:

FIG. 8 is a fragmentary right side elevational view of the retaining support of FIG. 7 receiving a plurality of rollers; and FIG. 9 is a fragmentary top plan view of the retaining support of FIGS. 7-8 coupled to a frame assembly.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

"A" and "an" as used herein indicate "at least one" of the item is present; a plurality of such items may be present, when possible. As used herein, "substantially" means "to a considerable degree," "largely," or "proximately" as a person skilled in the art in view of the instant disclosure would understand the term. Spatially relative terms, such as "front," "back," "inner," "outer," "bottom," "top," "horizontal," "vertical," "upper," "lower," "side," "up," "down," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
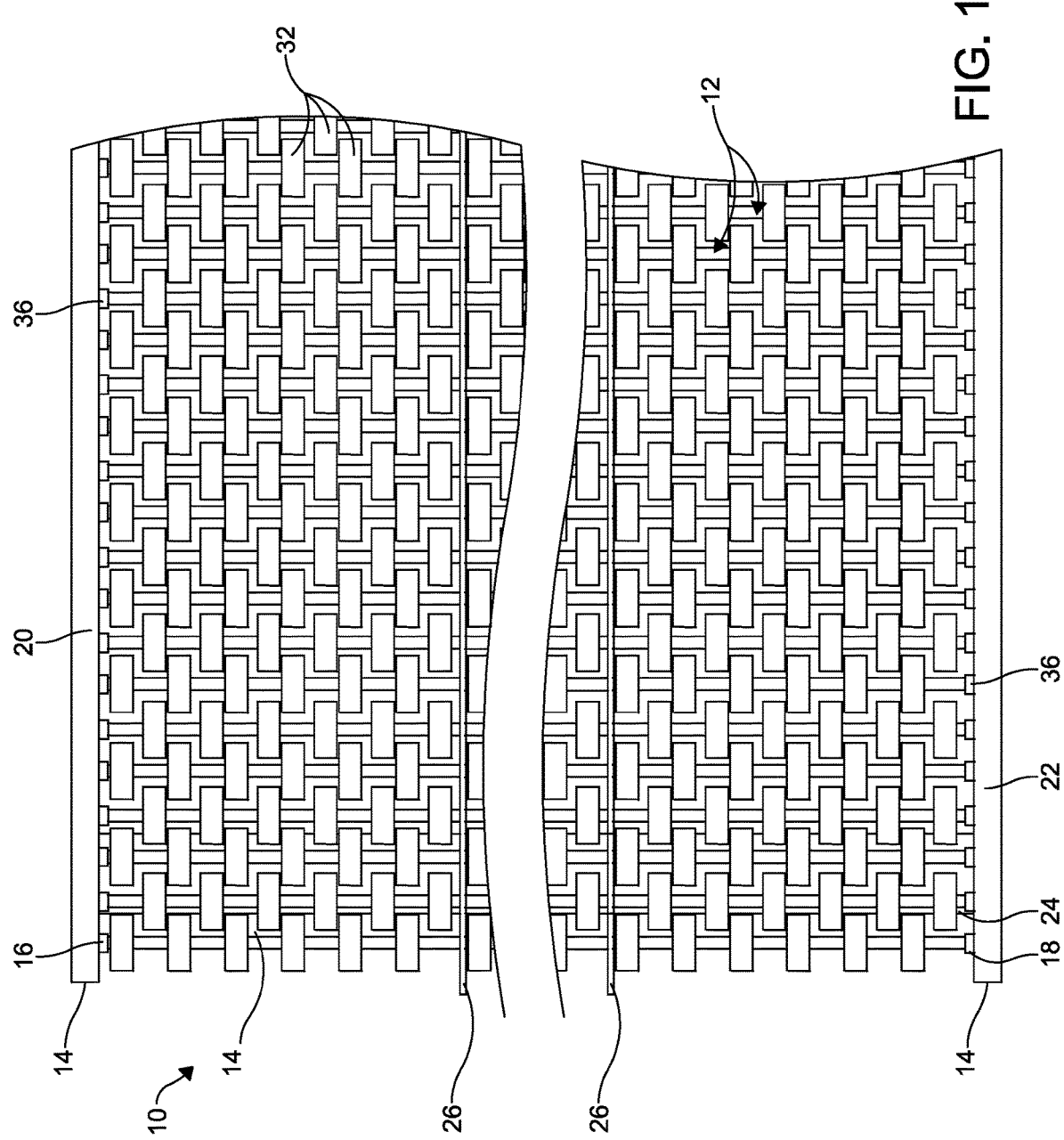
FIG. 1 is a fragmentary top plan view of a conveyer system according to an embodiment of the instant disclosure.
Figure 2:
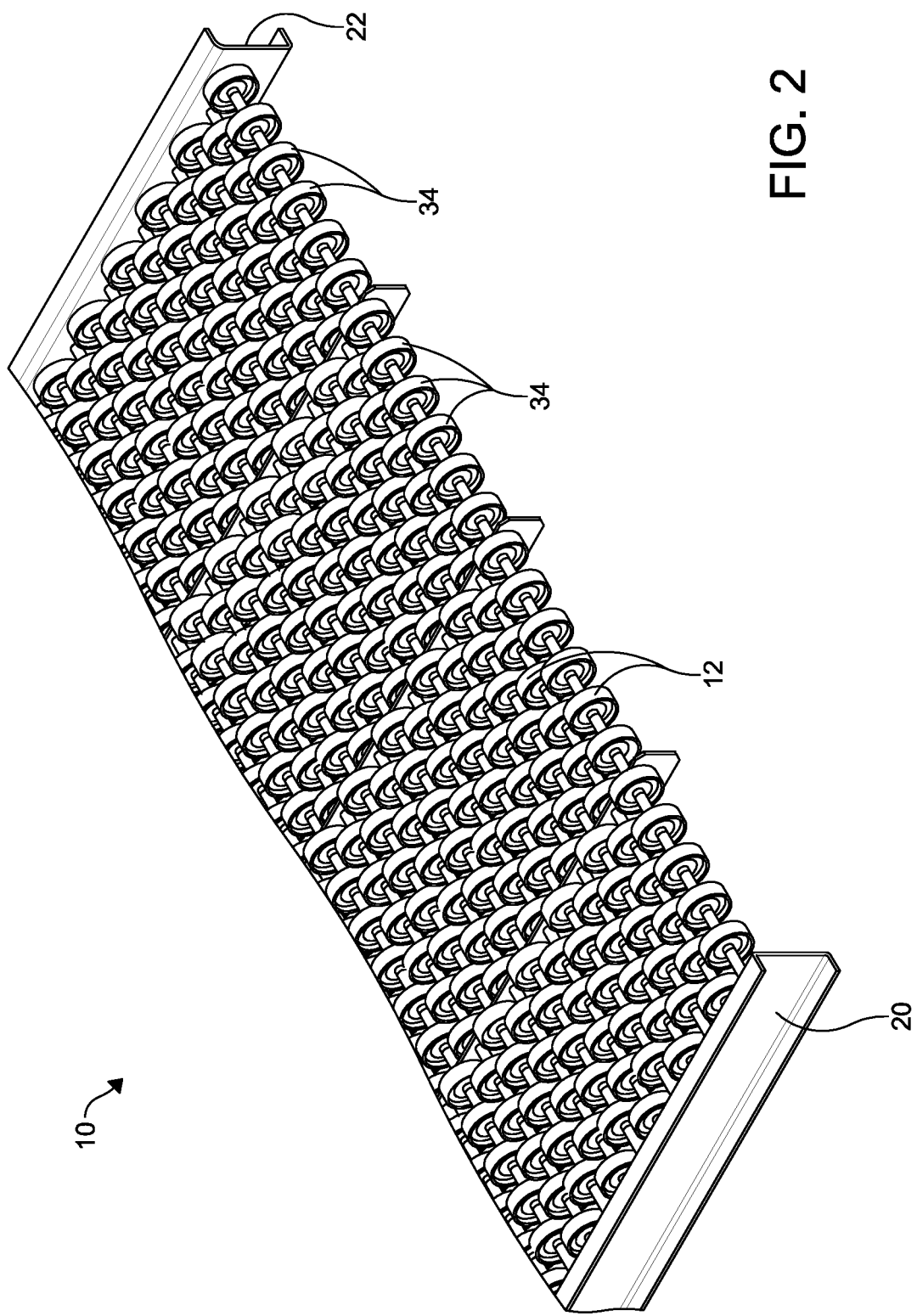
FIG. 2 is a fragmentary top perspective view of the conveyor system of FIG. 1.
Figure 3:
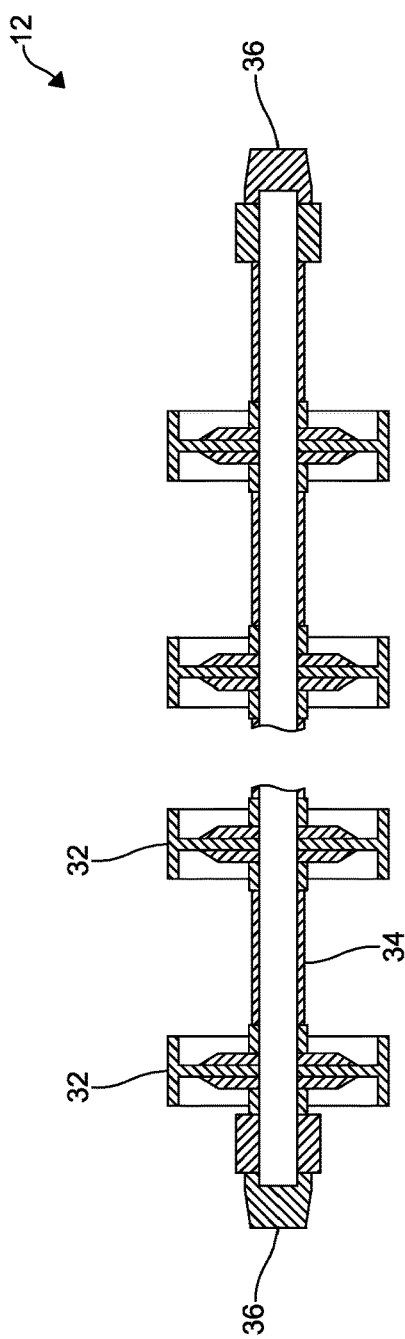
FIG. 3 is a fragmentary front elevational cross-sectional view of a roller of the conveyor system of FIGS. 1-2, wherein a middle portion of the roller is removed for convenience.
Figure 4:
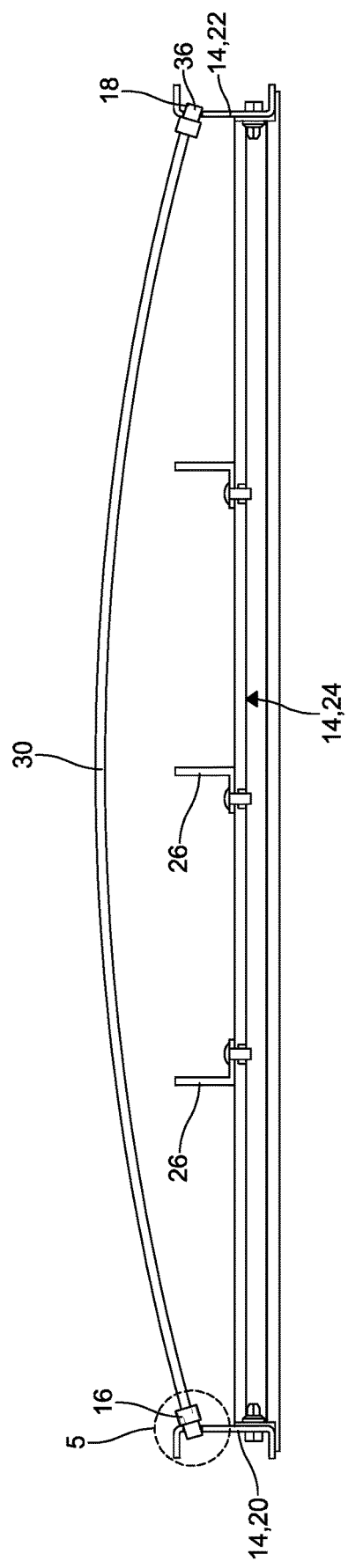
FIG. 4 is a front cross-sectional elevational view of a frame assembly of the conveyor system of FIGS. 1-2, wherein a shaft and end caps of a roller of the conveyor system is being inserted into the conveyor system.
Figure 5:
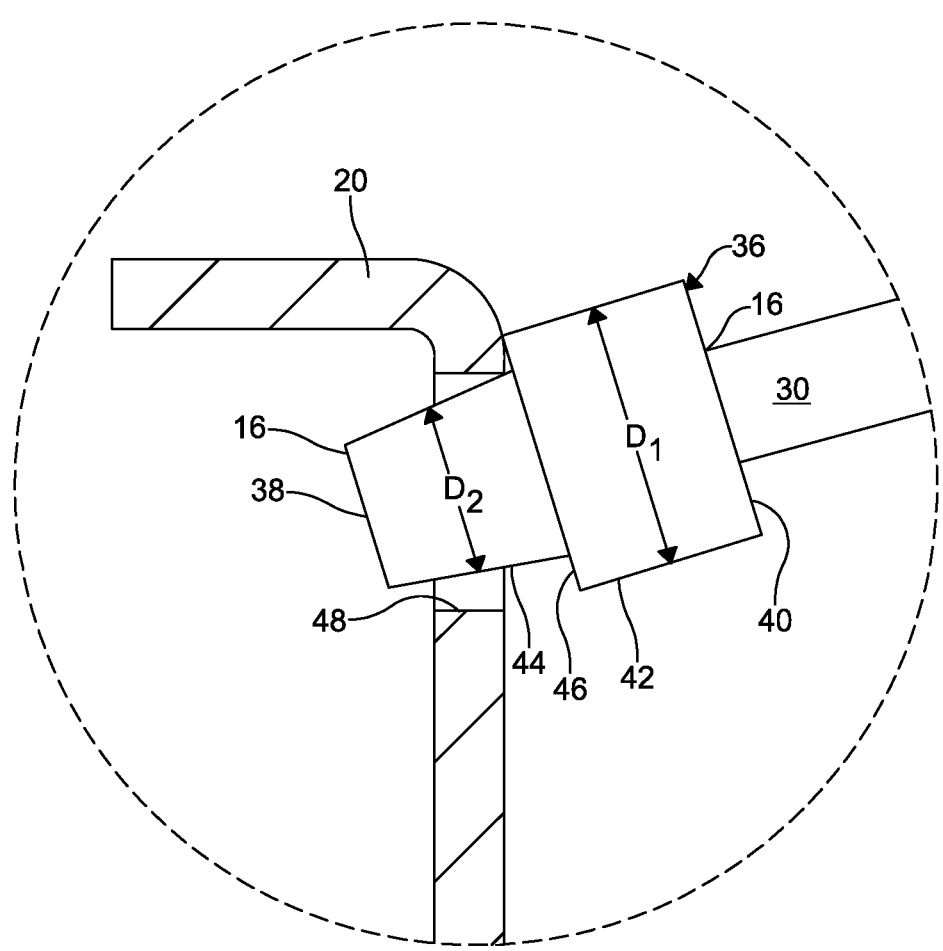
FIG. 5 is an enlarged fragmentary front cross-sectional elevational view of a side of the frame assembly of FIG. 4 highlighted by circle 5 of FIG. 4, wherein an end of the shaft is shown being inserted into a side of the frame assembly.
Figure 6:
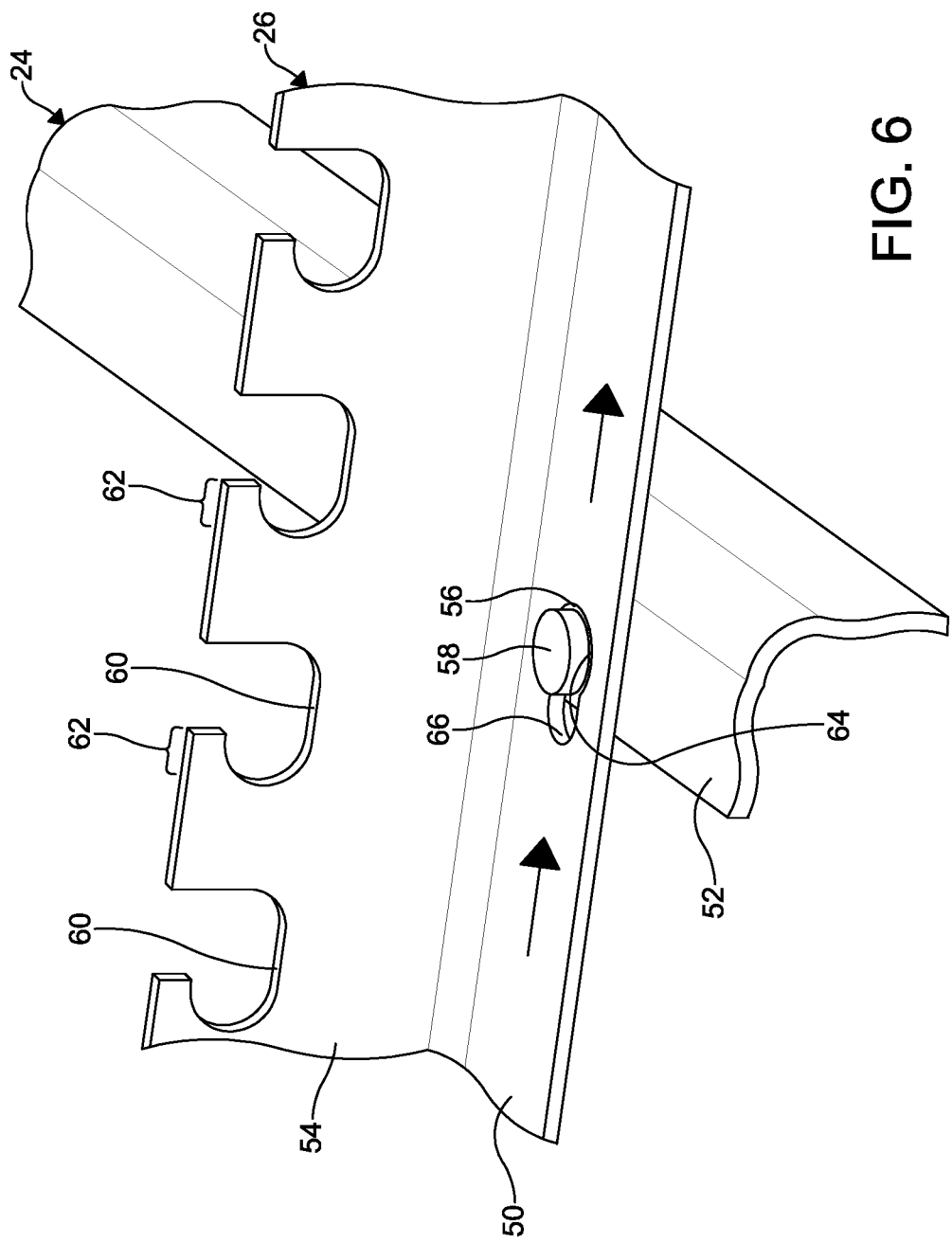
FIG. 6 is a fragmentary top perspective view of the a cross member and a retaining support of a frame assembly of the conveyor system of FIGS. 1-2.

FIGS. 1-3 illustrate a skate wheel conveyor system 10 employing a plurality of skate wheel rollers 12 according to an embodiment of the present disclosure. The conveyor system 10 is configured to move a load such as packages, products, or equipment, for example, from one location to another. The rollers 12 are rotatingly mounted at preset intervals within a frame assembly 14, with a first end 16 of each of the rollers 12 mounted to a first side 20 of the frame assembly 14 and a second end 18 of each of the rollers 12 mounted to a second side 22 of the frame assembly 14. The frame assembly 14 also includes cross members 24 extending a width of the conveyor system 10 between the first side 20 and the second side 22 The cross members 24 provide structural support to the frame assembly 14 and the rollers 12 when mounted in the frame assembly 14. Support from the cross members 24 to the rollers 12 is provided by retaining supports 26 extending from the cross members 24 to receive the rollers 12. The retaining supports 26 extend along a length of the conveyor system 10 substantially parallel to the sides 20, 22 of the frame assembly 14. The retaining supports 26 also facilitate a deflection of the rollers 12 in the frame assembly 14.

Each of the rollers 12 includes an axle or shaft 30, a plurality of skate wheels 32 equally and axially spaced from each other, and a plurality of tube or bushing spacers 34 equally and axially spaced from each other. The skate wheels 32 and the spacers 34 are received on the shaft 30 in an alternating pattern. The conveyor system 10 is configured as a free gravity conveyor system, wherein each of the rollers 12 via the skate wheels 32 facilitates movement of the load across the conveyor without being driven by a drive device such as a motor, for example. The conveyor system 10 may be positioned on a slight incline so gravity assists with the movement of the load. In another embodiment, the conveyor system 10 may be on a non-incline, wherein the rollers 12 assist a user moving the load across the conveyor system 10. It is understood, in another embodiment, the rollers 12 can be driven, directly or indirectly, by a drive device if desired. The rollers 12 are arranged parallel to each other and substantially perpendicular to the sides 20, 22 of the frame assembly 14 forming a substantially straight conveyor system 10. However, it is understood, the conveyor system 10 can be curved, wherein the rollers 12 are formed at angles with respect to each other.

The rollers 12 include a compression end cap 36 received on the shafts 30 at each end of the rollers 12. The end cap 36 is configured to facilitate retention of the skate wheels 32 and the spacers 34 on the shaft 30 and to facilitate assembly of the rollers 12 to the frame assembly 14. The end cap 36 includes a closed end 38 and an open end 40 for receiving the shaft 30. The end caps 36 are coupled to the shaft 30 by an interference fit. However, it is understood the caps 36 can be coupled to the shaft 30 by other coupling means such as by threads formed on the outer surface of the shaft 30 engaging threads formed on an inner surface of the end caps 36, by a key and slot arrangement, a cam lock, pins, screws, or any other coupling means as desired.

Each of the end caps 36 includes a first portion 42 adjacent the open end 40 thereof and a second portion 44 adjacent the closed end 38 thereof. The first potion 42 has a substantially constant diameter $D_1$ diameter along an axial direction thereof. The second portion 44 tapers from the first portion 42 to the closed end 38 of the end cap 36, wherein a diameter $D_2$ of the second portion 44 decreases axially from the first portion 42 of the end cap 36 to the closed end 38 of the end cap 36. The diameter $D_2$ of the second portion 44 is less than the diameter $D_1$ of the first portion 42, wherein an annular flange 46 is formed at an interface of the first portion 42 and the second portion 44. The end caps 36 are formed from a polymer. However, it is understood the end cap 36 can be formed from other materials if desired.

The end caps 36 are received in an aperture 48 formed in a respective one of the sides 20, 22 of the frame assembly 14. The tapered second portion 44 facilitates insertion of the end caps 36 into the sides 20, 22 of the frame assembly 14. The flange 46 militates against the end caps 36 being inserted into the sides 20, 22 beyond the tapered second portion 44. A length of the shaft 30 between flanges 46 of the end caps 36 is substantially equal to a width of the frame assembly 14 between inner surfaces of the sides 20, 22. When inserting the skate wheel rollers 12 into the sides 20, 22 of the frame assembly 14, the shaft 30 slightly arcs or bends in a convex manner with respect to a plane extending through the cross members 24, wherein an insertion of the end caps 36 into the sides 20, 22 is facilitated.

The retaining supports 26 are formed from an angled "L" shaped elongate member and includes a planar first plate segment 50 substantially parallel with a plane extending through a top surface 52 of the cross members 24 along a length of the frame assembly 14. The retaining supports 26 further include a planar second plate segment 54 extending substantially perpendicularly with the first plate segment 50. A key hole shaped hole 56 is formed in the first plate segment 50. The hole 56 receives a coupler 58 such as a bolt, rivet, pin, screw, or similar type coupler. The coupler 58 couples each of the retaining supports 26 to the cross members 24. While only one hole 56 and coupler 58 are shown, it is understood a plurality of holes 56 and couplers 58 can be used to couple the retaining supports 26 to the cross members 24, wherein each of the holes 56 and couplers 58 are employed at each of the cross members 24. Therefore, a space between the holes 56 and the couplers 58 are disposed as a distance between cross members 24. The holes 56 receive the coupler 58 in a larger circular portion 64 and retaining supports 26 are slid or displaced in a direction indicated by the arrow, wherein the coupler 58 is then received in a smaller circular portion 66 of the holes 56.

The second plate segment 54 includes a plurality of "J" or "boot" shaped slots 60 as shown, wherein a lip 62 extends over a portion of each of the slots 60. A series of the retaining supports 26 extends across a width of the frame assembly 14 to receive the rollers 12. As shown, there are three retaining supports 26. However, it is understood more than three or fewer than three retaining supports 26 can be employed depending on the conveyor system 10 application and the width of the frame assembly 14. When received in the slots 60, the lip 62 facilitates retaining of the rollers 12 to the frame assembly 14. More specifically, the retaining supports 36 slide from a first position to clamp the rollers 12 into the frame assembly 14 to a second position to unclamp the rollers 12 from the frame assembly 14.

The end caps 36, convex arcing of the shaft 30 and consequently the preassembled rollers 12, and the retaining supports 26 form a quick assembly system for facilitating efficient and assembling of the rollers 12 to the frame assembly 14. The quick assembly system is cost and time efficient, facilitates ergonomic benefits, minimizes maintenance downtime and costs, and prolongs the life of the conveyor system 10, parts thereof and the ability and structure to convey the load thereon.

To assemble the conveyor system 10, the frame assembly 14 is assembled at a location or facility, such as a manufacturing, packaging, or distribution facility, where the products require conveying. The conveyor system 10 may be part of a larger conveyor system 10 or larger assembly line of equipment and/or conveyors. The frame assembly 14 may be specifically specified with predetermined parameters for receiving specific rollers 12 for a specific application or the frame assembly 14 may be from a pre-existing conveyor system or assembly line and is either capable of or retrofitted to receive the pre-assembled rollers 12 for a specific application.

The rollers 12 are preassembled at a different location or facility from the location of the frame assembly 14, wherein the skate wheels 32 and the spacers 34 are alternately received on the shaft 30. The end caps 36 are then received on the ends 16, 18 of the rollers 12. The amount of the spacers 34 and the wheels 32 received on the shaft 30 may be predetermined based on application of the conveyor system 10. The preassembled rollers 12 are then shipped to the location or facility of the frame assembly 14. In another embodiment, the wheels 32, the shaft 30, the spacers 34, and the end caps 36 are shipped or delivered as a kit to the location of the frame assembly 14 and are then assembled into the rollers 12 at the location or facility of the frame assembly 14. In yet another embodiment, the rollers 12 and frame assembly 14 are assembled are shipped or delivered and assembled together.

The rollers 12 are then inserted into the frame assembly 14 by flexing the shaft 30 and inserting the second portion 44 of the end caps 36 into the respective ones of the apertures 48 formed in the sides 20, 22 of the frame assembly 14. Once the end caps 36 are received in the apertures, the shaft 30 straightens so the rollers 12 no longer flexed. The rollers 12 are then received in the slots 60 of the retaining supports 26. The retaining supports 26 are then slid from the second position to the first position to clamp the rollers 12 to the frame assembly 14.

Figure 7:
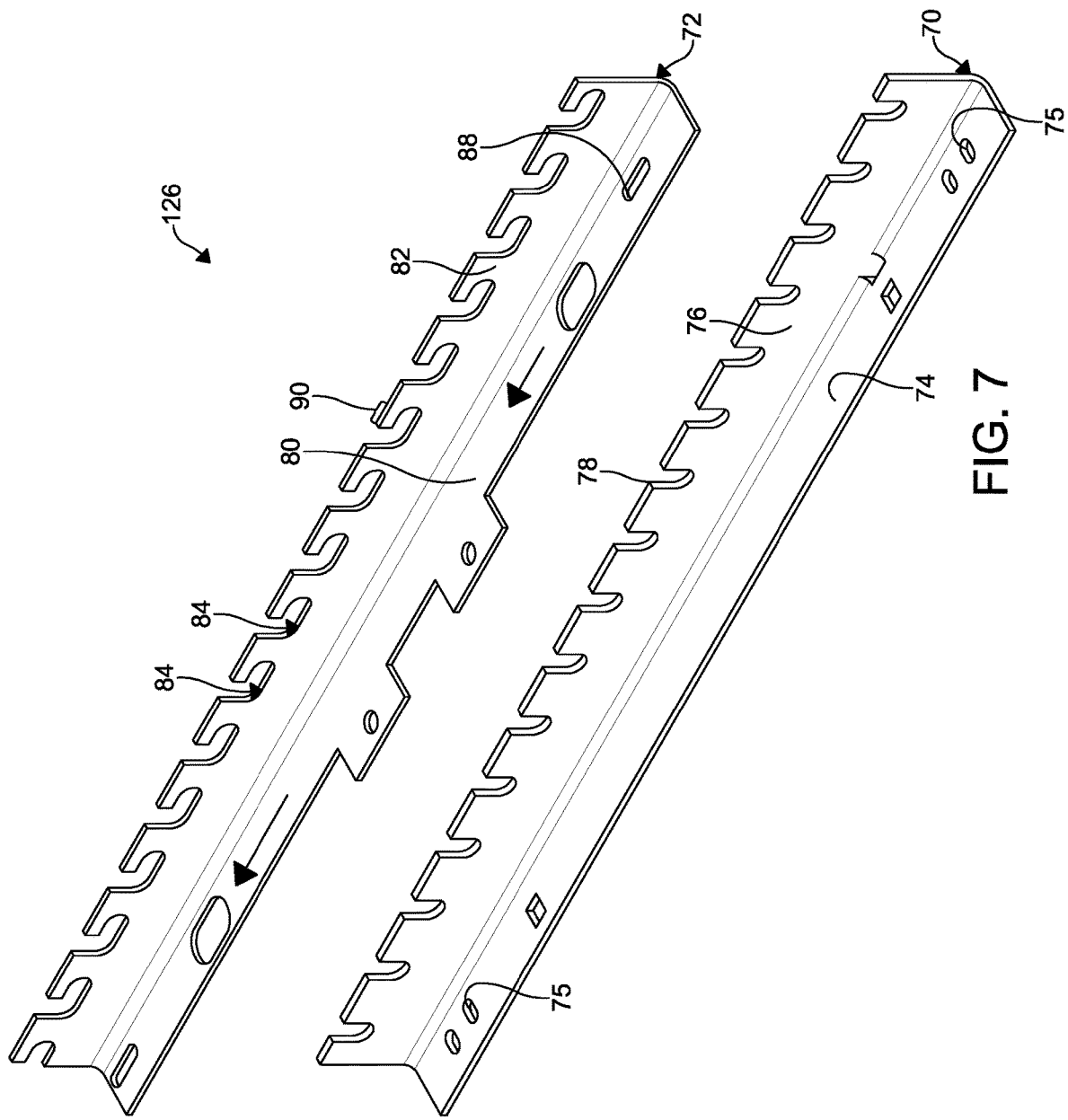
FIG. 7 is a exploded top perspective view of a retaining support of a conveyor system according to another embodiment of the present disclosure.

According to another embodiment of the present disclosure, as shown in FIGS. 7-9, the conveyor system 110 is substantially similar to the conveyor system 10 of FIGS. 1-6. Reference numerals illustrating features of the conveyor system 110 of FIGS. 7-9 which are the same as the features of the conveyor system 10 of FIGS. 1-6 include the same reference numeral and a leading "1," for convenience. The conveyor system 110 of FIGS. 7-9 includes a different quick assembly system. Specifically, the retaining supports 126 of the quick assembly system is different, which will be described in further detail below, and the rollers 112 do not include the end caps 36. Although, it is understood, the rollers 112 can include the end caps 36 and can flex or arc in the convex manner as described with reference to FIGS. 1-6, if desired.

The retaining supports 126 are formed from a first angled member 70 and a second angled member 72 slidingly cooperating with each other to receive and retain the rollers 112 to the frame assembly 114. The first angled member 126 are formed from an angled "L" shaped elongate member includes a first planar plate segment 74 and a second planar plate segment 76 extending substantially perpendicularly from the first planar plate segment 74. Similar to the retaining supports 26 of the conveyor system 10 of FIGS. 1-6, support from the cross members to the rollers 112 is provided by the first angled member 70 extending from the cross members to receive the rollers 112. The first angled members 70 extend along a length of the conveyor system 110 substantially parallel to the sides 120, 122 of the frame assembly 114. The first planar plate segment 74 is substantially parallel with a plane extending through the top surface 52 of the cross members along a length of the frame assembly 114.

The first planar plate segment 74 includes holes for receiving a coupler 86 for coupling the first angled member 70 to the second angled member 72. Other coupling holes or features may be included for coupling the first angled member 70 directly to the cross members to the frame assembly 114. The second planar segment 76 includes a plurality of "U" shaped slots 78 for receiving the rollers 112, such as the shaft 130 of the rollers 112. It is understood the slots 78 may have other shapes as desired.

The second angled member 72 is formed from an angled "L" shaped elongate member includes a first planar plate segment 80 and a second planar plate segment 82 extending substantially perpendicularly from the first planar plate segment 80. The second angled member 72 is configured to retain, secure, clamp, or "lock" the rollers 112 within the slots 78 of the first angled member 70. The first planar segment 80 of the second angled member 72 slidingly engages the first planar segment 74 of the first angled member 70. Slots 88 are formed in the first planar segment 80 of the second angled member 72 to align with the holes 75 of the first angled member 70 and are configured to receive the coupler 86. The slots 88 are elongate so the coupler 86 can move from one end thereof to the other end thereof upon sliding of the second angled member 72 with respect to the second angled member in a direction indicated by the arrow.

The second planar segment 82 includes a plurality of "J" or "boot" shaped slots 84 as shown, wherein a lip 90 extends over a portion of each of the slots 84. To assemble the retaining supports 126 to the frame assembly 114, the first angled member 70 is coupled to the cross members. The second angled member 72 is slidingly coupled to the first angled member 70, wherein the second planar segment 82 is engaging or closely adjacent the second planar segment 76 of the first angled member 70 (i.e. the "L" shape of the angled members 70, 72 are facing the same direction). Although it is understood, in another embodiment, the second planar segment 82 of the second angled member 72 can be spaced from the second planar segment 76 of the first angled member 70 (i.e. the "L" shaped of the angled members 70, 72 are facing opposite or mirror image direction from each other). The holes 75 align with a first end of the slots 88 and the coupler 86 received through the slots 88 and holes 75 so the slots 78 of the first angled member 70 align with the slots 84 of the second angled member 72 such that the lip 90 does not extend over the slots 78 in the first angled member.

The rollers 112 are then received in the slots 78, 84 of the angled members 70, 72. The second angled member 72 is linearly displaced or slid in the direction indicated by the arrow so the lips 90 extend over the slots 78 of the first angled member 70 and retain the rollers 112 in the slots 78 of the first angled members 70. While only one retaining support 126 is shown, a series of the retaining supports 126 can extend across a width of the frame assembly 114 to receive the rollers 112.

Advantageously, the preassembled rollers 12, 112 and quick assembly systems of the present disclosure facilitate in easier assembly and disassembly of the rollers 12, 112 from the frame assembly 14, 114. Additionally, costs of assembly and maintaining the conveyor system 10, 110 are minimized. The quick assembly system 14, 114 advantageously includes retaining supports 26, 126 to minimize deflections of the rollers 12, 112 and retaining the rollers 12, 112 within the frame assembly 14, 114 when used in conveying application.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A skate wheel conveyor system comprising:
    a pair of frame sides of a frame assembly;
    a plurality of preassembled rollers received between the pair of frame sides, each of the plurality of rollers including a plurality of wheels interposed between a plurality of spacers and a flexible shaft receiving the plurality of wheels and the plurality of spacers; and
    a quick assembly system retaining the plurality of rollers between the pair of frame sides and minimizing deflections of the plurality of rollers, the quick assembly system including the shaft and a compression end cap disposed at each of and receiving each of a first end of the shaft and a second end of the shaft, wherein an outermost portion of each of the compression end caps with respect to a length direction of the plurality of rollers is tapered, the compression end cap including a first portion and a second portion, and wherein a flange is disposed at an interface of the first portion of the first compression end cap and the second portion of the first compression end cap.

2. The skate wheel conveyor system of claim 1, wherein the outermost portion of each of the compression end caps is configured to be received in an aperture in the frame assembly.

3. The skate wheel conveyor system of claim 2, wherein a diameter of an innermost portion of each of the compression end caps with respect to the length direction of the plurality of rollers is constant.

4. The skate wheel conveyor system of claim 3, wherein a diameter of at any point in the length direction of the outermost portion is less than the diameter of the innermost portion.

5. The skate wheel conveyor system of claim 3, wherein a diameter of the outermost portion decreases with respect to the length direction leading away from the innermost portion.

6. The skate wheel conveyor system of claim 5, wherein the diameter of at least a portion the outermost portion decreases at a constant rate.

7. The skate wheel conveyor system of claim 2, wherein the shaft is configured to arc in a convex manner with respect to a surface of the frame assembly when positioning the plurality of rollers into the sides of the frame assembly and is configured to straighten when the compression end cap is received in the aperture.

8. The skate wheel conveyor system of claim 1, wherein the compression end cap is formed from a polymer.

9. The skate wheel conveyor system of claim 1, wherein the compression end cap includes a closed end and an open end for receiving the shaft.

10. The skate wheel conveyor system of claim 1, wherein the compression end cap is coupled to the shaft by an interference fit.

11. A skate wheel conveyor system comprising:
    a pair of frame sides of a frame assembly, each of the pair of frame sides including an aperture formed therein;
    a plurality of rollers received between the pair of frame sides, each of the plurality of rollers including a plurality of wheels interposed between a plurality of spacers and a shaft capable of convexly arcing receiving the plurality of wheels and the plurality of spacers; and
    a first compression end cap directly coupled to a first end of the shaft of each of the plurality of rollers, the first compression end cap including a first portion and a second portion, the first portion of the first compression end cap received in the aperture of a first one of the pair of frame sides facilitated by a flexing of the shaft during installation thereof, wherein a flange is disposed at an interface of the first portion of the first compression end cap and the second portion of the first compression end cap.

12. The skate wheel conveyor system of claim 11, further comprising a second compression end cap coupled to a second end of each of the plurality of rollers, a first portion of the second compression end cap received in the aperture of a second one of the pair of frame sides facilitated by the flexing of the shaft during installation thereof, wherein a diameter of each of the first portion of the first compression end cap and the first portion of the second compression end cap is less than a diameter of the aperture formed in a respective one of the pair of frame sides, and wherein a diameter of each of the second portion of the first compression end cap and the second portion of the second compression end cap is greater than the diameter of the aperture formed in the respective one of the pair of frame sides.

13. The skate wheel conveyor system of claim 11, wherein the shaft of each of the plurality of rollers convexly arcs with respect to the frame assembly when inserting the plurality of rollers between the pair of frame sides.

14. The skate wheel conveyor system of claim 11, wherein the plurality of rollers is preassembled with the plurality of wheels and the plurality of spacers before inserting the plurality of rollers between the pair of frame sides.

15. A skate wheel conveyor system comprising:
a pair of frame sides of a frame assembly, the pair of frame sides each including an aperture formed therein;
a plurality of preassembled rollers received between the pair of frame sides, each of the plurality of rollers including a plurality of wheels interposed between a plurality of spacers and a flexible shaft receiving the plurality of wheels and the plurality of spacers;
a first compression end cap coupled to a first end of each of the plurality of rollers, the first compression end cap including a first portion and a second portion, the second portion of the first compression end cap received in the aperture of a first one of the pair of frame sides is facilitated by a flexibility of the shaft, wherein a first flange is disposed at an interface of the first portion of the first compression end cap and the second portion of the first compression end cap, and wherein the first end of the shaft is received in the first portion of the first compression end cap; and
a second compression end cap coupled to a second end of each of the plurality of rollers, the second compression end cap including a first portion and a second portion, the second portion of the second compression end cap received in the aperture of a second one of the pair of frame sides is facilitated by the flexibility of the shaft, wherein a flange is disposed at an interface of the first portion of the second compression end cap and the second portion of the second compression end cap, wherein the second end of the shaft is received in the first portion of the second compression end cap, and wherein a length of the shaft between the flange of the first compression end cap and the flange of the second compression end cap is substantially equal to a width of the frame assembly between inner surfaces of the pair of frame sides.

16. The skate wheel conveyor system of claim 15, wherein the shaft straightens when the first compression end cap and the second compression end cap are received in respective ones of the apertures.

17. The skate wheel conveyor system of claim 16, wherein the second portion of each of the first compression end cap and the second compression end cap is disposed at an outermost portion of the plurality of rollers with respect to a length direction of the plurality of rollers, and wherein the first portion of each of the first compression end cap and the second compression end cap has a first diameter and the second portion has a second diameter less than the first diameter.

18. The skate wheel conveyor system of claim 15, wherein the shaft moves from a first position to a second position, wherein the shaft in the first position arcs convexly with respect to a surface of the frame assembly so the second portion of each of the first compression end cap and the second compression end cap is inserted into the aperture of a respective one of the pair of frame sides, and wherein the shaft in the second position is substantially horizontal and the second portion of each of the first compression end cap and the second compression end cap is received and maintained within the aperture of the respective one of the pair of frame sides.

19. The skate wheel conveyor system of claim 17, wherein the first portion of each of the first compression cap and the second compression cap is directly adjacent the inner surface of a respective one of the pair of frame sides.

* * * * *